(12) United States Patent
Wang et al.

(10) Patent No.: US 8,860,395 B2
(45) Date of Patent: Oct. 14, 2014

(54) CIRCUIT AND METHOD FOR GENERATING A RAMP COMPENSATION VOLTAGE FOR A SWITCHING REGULATOR

(75) Inventors: Basa Wang, Shanghai (CN); Kevin Yao, Shanghai (CN); Jack Zhu, Shanghai (CN); Helen Yu, Shanghai (CN)

(73) Assignee: Analog Devices, Inc., Norwood, MA (US)

( * ) Notice: Subject to any disclaimer, the term of this patent is extended or adjusted under 35 U.S.C. 154(b) by 186 days.

(21) Appl. No.: 13/343,615

(22) Filed: Jan. 4, 2012

(65) Prior Publication Data

US 2013/0043856 A1 Feb. 21, 2013

(30) Foreign Application Priority Data

Aug. 15, 2011 (CN) .......................... 2011 1 0231706

(51) Int. Cl.
| | |
|---|---|
| G05F 1/00 | (2006.01) |
| H03K 4/06 | (2006.01) |
| H02M 3/156 | (2006.01) |
| H02M 1/00 | (2006.01) |

(52) U.S. Cl.
CPC ...... *H02M 3/156* (2013.01); *H02M 2001/0025* (2013.01)
USPC .......................................... 323/288; 327/131

(58) Field of Classification Search
USPC ......... 323/271, 282, 284, 285, 288, 312–317; 363/40, 41; 327/170, 173–175, 327/131–140
See application file for complete search history.

(56) References Cited

U.S. PATENT DOCUMENTS

| | | | | |
|---|---|---|---|---|
| 5,717,322 | A * | 2/1998 | Hawkes et al. | 323/283 |
| 5,903,452 | A * | 5/1999 | Yang | 363/97 |
| 7,061,225 | B2 * | 6/2006 | Yang et al. | 324/103 P |
| 7,126,318 | B2 | 10/2006 | Oswald et al. | 323/288 |
| 7,656,142 | B2 | 2/2010 | Liao | 323/288 |
| 7,898,825 | B2 | 3/2011 | Mulligan et al. | 363/21.13 |
| 8,004,253 | B2 | 8/2011 | Beltran | 323/266 |
| 2002/0118002 | A1 * | 8/2002 | Luo | 323/316 |
| 2010/0253313 | A1 * | 10/2010 | Herzer et al. | 323/312 |

* cited by examiner

*Primary Examiner* — Timothy J Dole
*Assistant Examiner* — Carlos Rivera-Perez
(74) *Attorney, Agent, or Firm* — Schwegman Lundberg & Woessner, P.A.

(57) ABSTRACT

The present invention relates to a circuit and method of generating a ramp compensation voltage as might be used in a switching regulator. The ramp compensation voltage comprises: a charging current generating circuit configured to receive a switching signal having a frequency of fs, a duty cycle of D and a period of Ts, the charging current generating circuit generating a charging current in direct proportion to $$\frac{f_s}{(1-D)DT_s};$$

and a voltage generating circuit for generating a quadratic ramp compensation voltage by means of the charging current. The resulting ramp compensation voltage enables the switching regulator to operate over a broad range of duty cycles. The generated ramp compensation voltage has an amplitude as low as possible, the generated compensation slope approximates to the target compensation slope as close as possible, and over compensation at low duty cycles is reduced as far as possible.

20 Claims, 11 Drawing Sheets

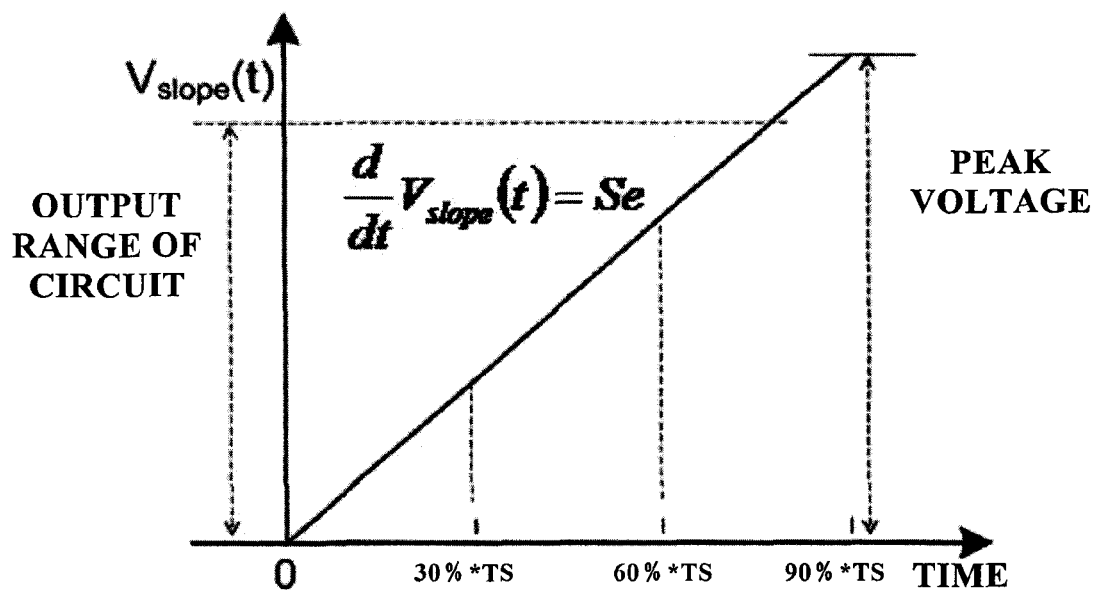
FIG. 3 (a) (PRIOR ART)
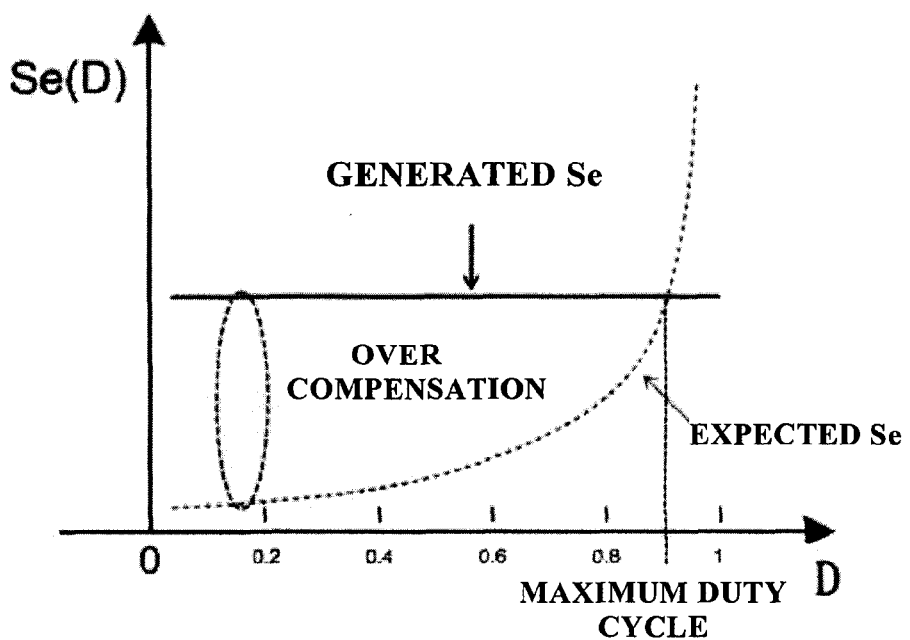
FIG. 3 (b) (PRIOR ART)

CIRCUIT AND METHOD FOR GENERATING A RAMP COMPENSATION VOLTAGE FOR A SWITCHING REGULATOR

TECHNICAL FIELD

The present invention generally relates to switching regulators, and more specifically, to a circuit and method for generating a ramp compensation voltage for switching regulators.

DESCRIPTION OF THE RELATED ART

With the development of science and technology, the requirements for PWM switching stabilized voltage/current power supplies are becoming higher and higher. Switching regulators are important components of PWM switching stabilized voltage/current power supplies, in which with the variations of input voltage, internal parameters and external loads, the output voltages/currents of power supplies can be stabilized by adjusting the width of turn-on pulses for the switching regulators in a feedback control mode.

Feedback control modes include voltage mode control, peak current mode control, and the like. In voltage mode control, the pulse-width regulation has better noise-resistance headroom, the duty cycle tuning is unlimited, and there is a better interaction adjustment for multi-way output power supplies, but the dynamic responses to input voltage variations are slow, and control loop design is complicated. In contrast, peak current mode control has a faster closed-loop transient response—that is, faster transient responses to input voltage and output load variations, and simple control loop design. Therefore, peak current mode control has been widely adopted in various applications.

In peak current mode switching regulators, however, when the duty cycle is higher than 50%, sub-harmonic oscillation may occur, leading to an unstable inductor current and an unstable output voltage. In order to address the above problems in a switching regulator employing peak current mode, ramp compensation is necessary.

Currently, there are three common ramp compensation techniques: (1) fixed linear ramp compensation; (2) adaptive linear ramp compensation; and (3) quadratic ramp compensation.

FIG. 1 shows an essential circuit of a switching regulator.

For various compensation techniques, an expected target compensation slope of a ramp compensation voltage is:

$$Se_{target} = \frac{V_{OUT}}{2L} \times R_{sense} \quad (1)$$

where $Se_{target}$ is the expected target slope, $V_{out}$ is the output voltage of the switching regulator, L is the inductance, and $R_{sense}$ is the resistance of the sense resistor.

In the switching regulator, the inductance is generally selected following an equation:

$$L = \frac{(1-D) \times V_{OUT}}{\alpha \times I_{LOAD} \times f_s} \quad (2)$$

where D is the duty cycle of a switching signal; $I_{LOAD}$ is the current flowing through a load, $f_s$ is the frequency of the switching signal, and α is a parameter ranging from 0.2 to 0.4.

It can be seen from equation (2) that information about L can be indirectly obtained through the conversion of frequency and duty ratio.

Substituting equation (2) into equation (1):

$$Se_{target} = \frac{V_{OUT}}{2L} \times R_{sense} = K_L \times \frac{f_s}{1-D} \quad (3)$$

where, $K_L = \frac{\alpha \times I_{LOAD} \times R_{sense}}{2}.$

It can be seen from equation (3) that the expected target slope is in direct proportion to $$\frac{f_s}{1-D}.$$

FIG. 2 shows the essential principles of a fixed linear ramp compensation technique. As shown in FIG. 2, there is a capacitor C in a fixed linear ramp compensation circuit, which is grounded at one end and is charged directly by a current $I_{charge}$, resulting in a ramp compensation voltage $V_{slope}$ (t) being generated at the other end of the capacitor C.

FIG. 3(a) is a diagram showing the variation of ramp compensation voltage with time for a fixed linear ramp compensation technique. It can be seen from FIG. 3(a) that the ramp compensation voltage increases linearly with time in one period of a switching signal. The compensation slope is the derivative $$\frac{d}{dt} V_{slope}(t)$$

of the ramp compensation voltage with respect to time. Since the ramp compensation voltage increases linearly with time, high peak voltages can be produced at low switching frequencies (long load periods) or large duty cycles, thus resulting in inadequate voltage headroom for the error amplifier (EA headroom).

FIG. 3(b) is a diagram showing the relationship between expected slope, compensation slope generated in the fixed linear ramp compensation technique, and the duty cycle. The slope Se generated with the fixed linear ramp compensation technique is constant with respect to the duty cycle D. In the Se-D coordinate system, Se(D) is represented by a horizontal line. According to equation (3), the expected compensation slope increases as the duty cycle increases. Therefore, for practical designs, the compensation slope Se must be designed with respect to the maximum duty cycle of the switching signal. However, overcompensation may occur at duty cycles smaller than the maximum duty cycle.

In order to alleviate the problems that may occur with fixed linear ramp compensation techniques, an adaptive linear ramp compensation technique is proposed. FIG. 4 shows a schematic diagram of a circuit for generating a charging current for an adaptive linear ramp compensation technique. In FIG. 4, the switches K1 and K3 have the same turn on/off state, while switch K2 has a turn on/off state opposite to that of the switches K1 and K3. The switching signal shown in FIG. 4 has a frequency of fs. T1 and T2 are PMOS transistors, and the gates of T1 and T2 are connected together, the sources of T1 and T2 are connected to a power line Vss, and the drain of T2 is connected to the gate of T2. The transistors T1 and T2 form a current mirror in the circuit. AMP is an operational amplifier. The non-inverting terminal of AMP is connected to a reference voltage $V_{REF}$, and a capacitor $C_{INT}$ is connected between the inverting terminal and the output terminal of AMP. T3 is a NMOS transistor, which is used to convert the output voltage of the operational amplifier to a current. Through the circuit shown in FIG. 4, a charging current is formed as follow:

$$I_{charge} = \frac{V_{REF} \times C_1 \times f_S}{(1-D)} \quad (4)$$

where D is the duty cycle of the switching signal, $V_{REF}$ is the reference voltage at the non-inverting terminal of amplifier AMP, C1 is the capacitance of capacitor C1, and fs is the frequency of the switching signal.

FIG. 5 shows a schematic diagram of a circuit for generating a compensation voltage signal with a charging current using an adaptive linear ramp compensation technique, which is similar to the circuit of FIG. 2. Through charging the capacitor $C_{C1}$ with $I_{charge}$ obtained in the circuit of FIG. 4, the ramp compensation voltage generated is:

$$V_{slope}(t) = \frac{V_{REF} \times C_1}{C_{C1}} \times \frac{f_s}{1-D} \times t \quad (5)$$

where t is time and $C_{C1}$ is the capacitance of the capacitor $C_{C1}$.

FIG. 6 is a diagram showing ramp compensation voltages corresponding to different duty cycles versus time for an adaptive linear ramp compensation technique. For this adaptive linear ramp compensation technique, the slope Se of the ramp compensation voltage gradually increases with the increasing of duty cycle D. For larger duty cycles, peak voltages may go beyond the limited range of the circuit, possibly leading to too small or inadequate output voltage headroom for the error amplifier.

FIG. 7 is a diagram showing the relationships between expected slope, the compensation slope generated with the adaptive linear ramp compensation technique, and duty cycle. For the adaptive linear ramp compensation technique, the generated compensation slope Se is very close to the target compensation slope. Therefore, overcompensation can be avoided through the adaptive linear ramp compensation technique; however, the ramp compensation voltage may still be too high at a high duty cycle, causing too small voltage headroom for the error amplifier.

SUMMARY

FIG. 8 is a schematic view of the principles of a quadratic ramp compensation technique. As shown in FIG. 8, a circuit which implements the quadratic ramp compensation technique comprises capacitors C1 and C2, each having one end grounded and their other end connected with a transconductive component. Through charging the capacitor C1 with a current $I_{charge}$ and then charging the capacitor C2 with the capacitor C1 via the transconductive component, a ramp compensation voltage $V_{slope}(t)$ is generated at one end of capacitor C2. Through charging the two capacitors and the transconductive component with the charging current $I_{charge}$, a quadratic ramp compensation voltage $V_{slope}(t)$ can be obtained:

$$V_{Slope}(t) = K' \cdot t^2 \quad (6)$$

where K' is a coefficient associated with the charging current $I_{charge}$, the capacitances of the capacitors C1 and C2, and the transconductance of the transconductive component and t is time.

It can be seen from equation (6) that the generated ramp compensation voltage is in direct proportion to the square of time. The slope of the ramp compensation voltage is as follow:

$$Se(t) = \frac{d}{dt} V_{Slope}(t) = 2 \times K' \cdot t \quad (7)$$

As mentioned previously, the switching signal has a frequency of fs, a period of Ts, and a duty cycle D and the target slope of the ramp compensation voltage is $$Se_{target} = K_L \times \frac{f_s}{1-D}.$$

At an operating point tc (tc=DTs), the slope of the ramp compensation voltage using the quadratic ramp compensation technique is:

$$\left. \frac{d}{dt} V_{Slope}(t) \right|_{t=DT_S} = 2 \times K' \times DT_S \quad (8)$$

In order to realize ramp compensation, the slope of the ramp compensation voltage at a required operating point tc=DTs must meet the target slope of the ramp compensation voltage; that is:

$$\left. \frac{d}{dt} V_{Slope}(t) \right|_{t=DT_S} = 2 \times K' \times DT_S = Se_{target} = K_L \times \frac{f_s}{1-D} \quad (9)$$

FIG. 9 is a diagram showing the relationships between ramp compensation voltage using the quadratic ramp compensation technique and ramp compensation voltage using the fixed linear ramp compensation technique, given that the target slope of the ramp compensation voltage at an operating point tc=DTs is satisfied. It can be seen from FIG. 9 that the ramp compensation voltage generated using the quadratic ramp compensation technique is lower than the ramp compensation voltage generated using the fixed linear ramp compensation technique, given that the target slope of the ramp compensation voltage at the operating point tc=DTs is met. Thus, the quadratic ramp compensation technique may improve voltage headroom for error amplifier.

FIG. 10 is a diagram showing the relationships between the expected slope as well as the compensation slope generated using the quadratic ramp compensation technique, and duty cycle. The compensation slope Se is designed according to the maximum duty cycle of the switching signal. For the quadratic ramp compensation technique, at the maximum duty cycle, the curve of the generated compensation slope intersects with the curve of the expected target compensation slope; that is, the generated compensation slope meets the compensation slope requirement. However, overcompensation may occur at duty cycles less than the maximum duty cycle.

Table 1 below shows a comparison between the fixed linear ramp compensation technology and the quadratic ramp compensation technology in a switching regulator circuit with Vin=2.7V, Vout=2.5V, L=0.47 µH, Iload=6 A, Rsense=0.1Ω, Fs=600 k and D=93%.

TABLE 1 a comparison of fixed linear ramp compensation technology and quadratic ramp compensation technology.

|  | Fixed linear ramp compensation technology | Quadratic ramp compensation technology |
| --- | --- | --- |
| Current sense voltage | 0.6 V | 0.6 V |
| Ramp compensation voltage (peak value) | 1.94 V | 0.97 V |
| Total voltage (current sense voltage + ramp compensation voltage) | 2.54 V | 1.57 V |
| Maximum output voltage of EA | 2.5 V | 2.5 V |

It can be seen from Table 1 that, with fixed linear ramp compensation, for large $I_{load}$, the error amplifier may be saturated due to the high peak value of the ramp compensation voltage. On the contrary, with quadratic ramp compensation, the peak value of the ramp compensation voltage can be effectively decreased.

The present invention generates a ramp compensation signal for a switching regulator which enables the switching regulator to operate over a broad range of duty cycles. The generated ramp compensation voltage has an amplitude as low as possible; the generated compensation slope approximates to the target compensation slope as close as possible, and overcompensation at low duty cycles is reduced as far as possible.

According to one aspect of the present invention, a circuit for generating a ramp compensation voltage is provided, which may comprise: a charging current generating circuit configured to receive a switching signal having a frequency of fs, a duty cycle of D and a period of Ts, the charging current generating circuit generating a charging current in direct proportion to $$\frac{f_s}{(1-D)DTs};$$

and a voltage generating circuit for generating a quadratic ramp compensation voltage by means of the charging current.

The ramp compensation voltage generating circuit of the present invention is utilized in switching regulators operating in peak current mode to compensate a sensing current with the generated signal.

Preferably, the charging current generating circuit comprises: a first current-voltage converting portion having an equivalent impedance in direct proportion to $$\frac{(1-D)}{fs}$$

for generating a first voltage; an integrating portion coupled to the first current-voltage converting portion for providing a second voltage; a first voltage-current converting portion coupled to the integrating portion for converting the second voltage to the charging current; a second current-voltage converting portion coupled to the first voltage-current converting portion and having an equivalent impedance in direct proportion to $$\frac{D}{fs},$$

for receiving the charging current and converting it to a third voltage; a second voltage-current converting portion coupled to the second current-voltage converting portion and the first current-voltage converting portion, for converting the third voltage to a first current to provide it to the first current-voltage converting portion.

Preferably, the voltage generating circuit comprises a first capacitor and a second capacitor, and a transconductive component coupled between the first and second capacitors, wherein the first capacitor receives the charging current and generates a corresponding voltage to be received by the transconductive component, the transconductive component converts the voltage to a current for charging the second capacitor, and the second capacitor generates the quadratic ramp compensation voltage.

Preferably, the first current is in inverse proportion to $(1-D)Ts$.

Preferably, the integrating portion is a switched capacitor integrator.

Preferably, the first voltage-current converting portion is a component having transconductive properties and capable of converting voltage to current.

Preferably, the first voltage-current converting portion is a NMOS transistor or a PMOS transistor.

Preferably, the second voltage-current converting portion is a component having transconductive properties and capable of converting voltage to current.

Preferably, the bandwidth of the ramp compensation voltage generating circuit is less than or equal to fs/12.

According to another aspect of the present invention, a switching regulator is provided which may comprise the above described ramp compensation generating circuit.

According to still another aspect of the present invention, there is provided a power supply comprising the above described switching regulator.

According to still another aspect of the present invention, there is provided a method of generating a ramp compensation voltage, comprising: receiving a switching signal having a frequency of fs, a duty cycle of D and a period of Ts; generating a charging current in direct proportion to $$\frac{f_s}{(1-D)DTs};$$

and generating a quadratic ramp compensation voltage using the charging current.

Preferably, generating the charging current in direct proportion to $$\frac{f_s}{(1-D)DTs}$$

comprises the following steps: (1) providing a first voltage by means of a first current-voltage converting portion, wherein the first current-voltage converting portion has an equivalent impedance in direct proportion to $$\frac{(1-D)}{fs};$$

(2) integrating the first voltage to provide a second voltage; (3) converting the second voltage to the charging current; (4) receiving the charging current by means of the second current-voltage converting portion to convert the charging current to a third voltage, wherein the second current-voltage converting portion has an equivalent impedance in direct proportion to $$\frac{D}{f_s};$$

(5) converting the third voltage to a first current to provide it to the first current-voltage converting portion; and repeating steps (1) to (5).

Preferably, the step of generating the quadratic ramp compensation voltage using the charging current comprises: providing first and second capacitors which are connected by a voltage-current converting component; charging the first capacitor with the charging current; and charging the second capacitor with a voltage generated by the first capacitor through the voltage-current converting component to generate the quadratic ramp compensation voltage.

Preferably, the first current is in inverse proportion to (1–D)Ts.

An appropriate ramp compensation signal can be generated according to the present invention, enabling the switching regulator to operate over a broad range of duty cycles. The generated slope is adaptive to the inductor if the inductor is selected following the design specification. According to the present invention, the generated ramp compensation voltage is only 50% of the ramp compensation voltage generated using conventional fixed linear ramp compensation techniques, significantly saving error amplifier headroom. The present invention is applicable to low input voltage and large current designs for switching regulators operating in peak current mode, and is capable of realizing large duty cycles (larger than 90%) and high performance current loop compensation.

BRIEF DESCRIPTION OF THE DRAWINGS

The detailed description of some exemplary embodiments below will be better understood when reading with reference of the accompanying drawings. However, it should be appreciated that those exemplary embodiments are not limited to the precise arrangements and means shown therein. Similar elements are referred to with similar numbers throughout the accompanying drawings. Further, in connection with the drawings and the technical field background techniques previously described, other desired features and characteristics will become apparent from the following detailed description and appended claims.

For the simplicity and clarity of illustration, the accompanying drawings show a general construction, and well known features and techniques may be omitted to avoid unnecessarily obscuring the aspects of those embodiments. Further, elements of those drawings may not be drawn to scale. For example, some elements or regions can be enlarged in size with respect to other elements of the same or other drawings to facilitate the understanding of those embodiments.

FIG. 3($a$) is a diagram showing the variation of ramp compensation voltage with time for the fixed linear ramp compensation technique;

FIG. 3($b$) is a diagram showing the relationships between the expected compensation slope as well as the compensation slope generated for the fixed linear ramp compensation technique, and the duty cycle;

DETAILED DESCRIPTION OF THE PREFERRED EMBODIMENT

Figure 1:
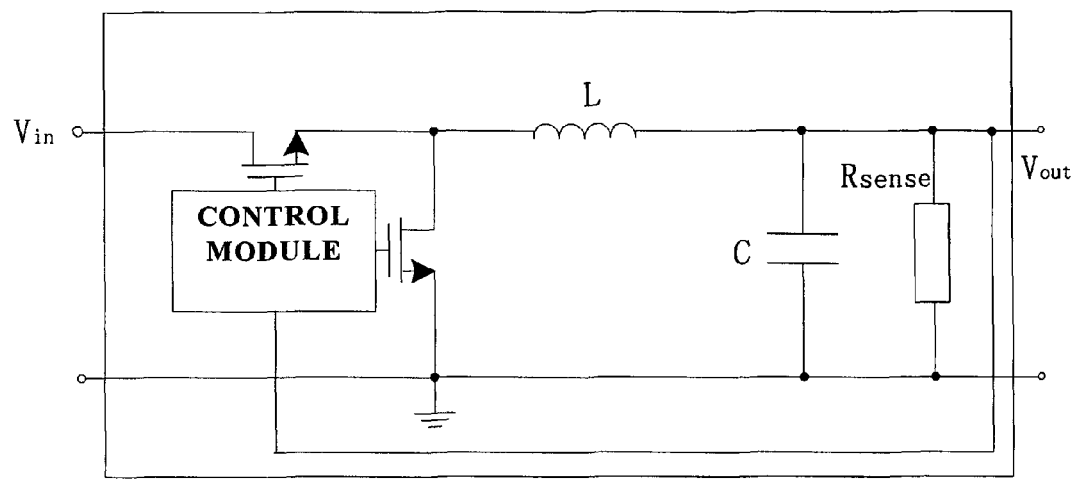
FIG. 1 shows a basic circuit for a switching regulator.
Figure 2:
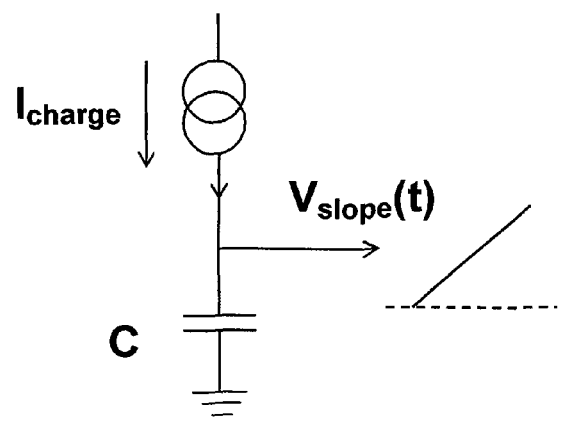
FIG. 2 is a schematic diagram of the basic principles of a fixed linear ramp compensation technique.
Figure 4:
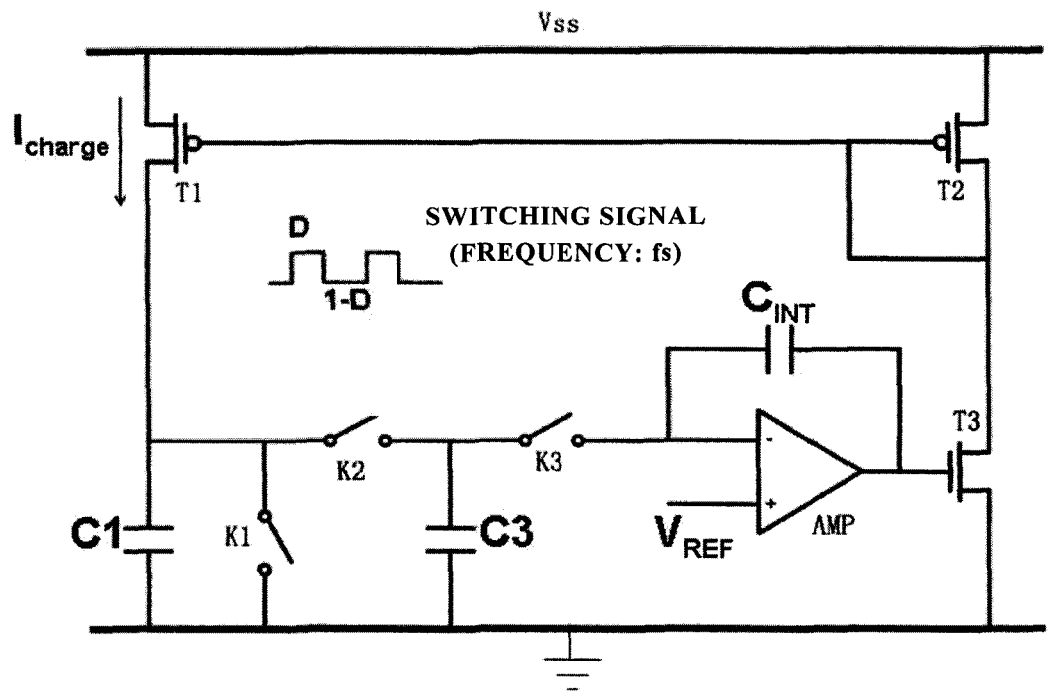
FIG. 4 is a schematic diagram showing a circuit for generating a charging current using an adaptive linear ramp compensation technique.
Figure 5:
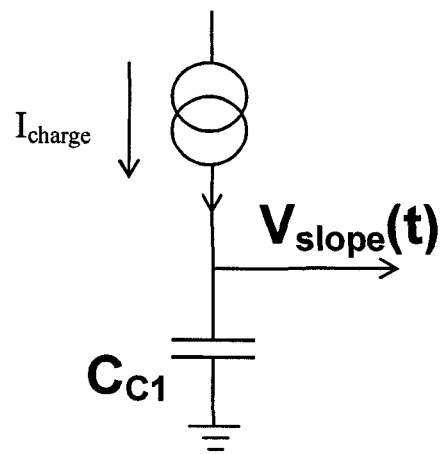
FIG. 5 is a schematic diagram showing a circuit for generating a compensation voltage signal using a charging current using the adaptive linear ramp compensation technique.
Figure 6:
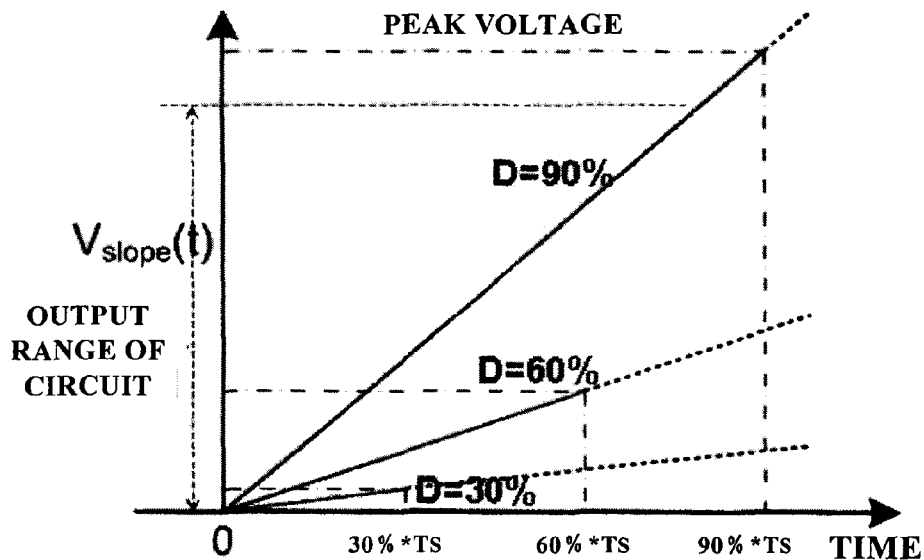
FIG. 6 is a diagram of ramp compensation voltage values corresponding to different duty cycles versus time for the adaptive linear ramp compensation technique.
Figure 7:
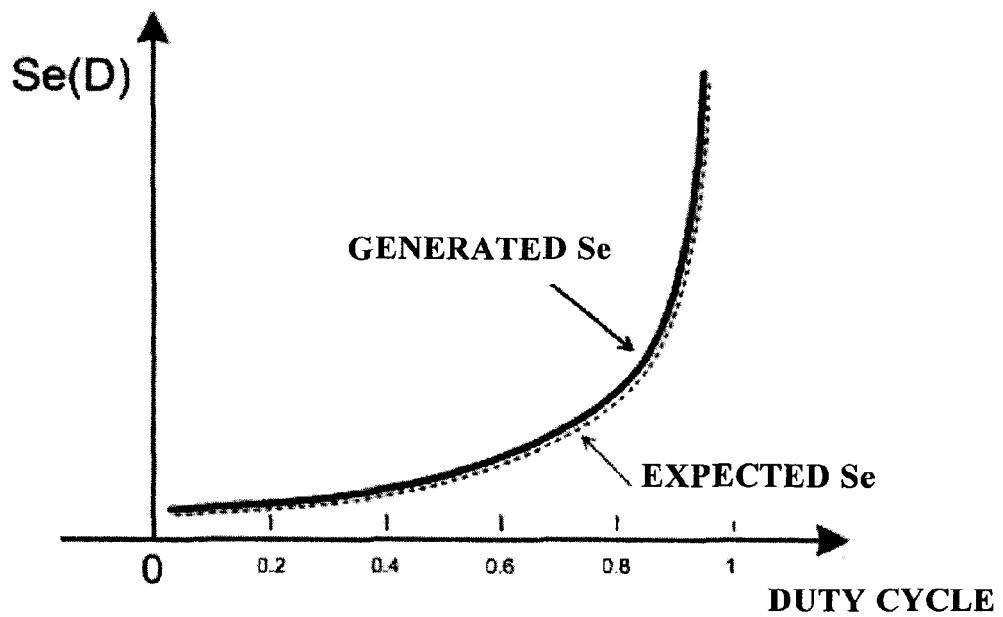
FIG. 7 is a diagram showing the relationships between the expected slope as well as the compensation slope generated for the adaptive linear ramp compensation technique, and the duty cycle.

Embodiments of the present invention will be described with reference to the drawings. The detailed description given below in connection with the drawings is intended to describe some exemplary embodiments, rather than a complete description of all possible embodiments, That is, any theory explicitly or implicitly given in the previous technical field and description of the related art, or the detailed description of exemplary embodiments below is not limited to any meaning.

It should be appreciated that the same or equivalent functions can be realized by different embodiments.

It should be noted that the relative arrangement of the components and steps, the numerical expressions, and numerical values set forth in these embodiments do not limit the scope of the present invention unless it is specifically stated otherwise.

The following description of at least one exemplary embodiment is merely illustrative in nature and is in no way intended to limit the invention, its application, or uses.

Techniques, methods and apparatus as known by one of ordinary skill in the relevant art may not be discussed in detail, but are intended to be regarded as a part of the specification where appropriate.

In all of the examples illustrated and discussed herein, any specific values should be interpreted to be illustrative only and non-limiting. Thus, other examples of the exemplary embodiments could have different values.

The use of the terms "first", "second", "third", "fourth" and the like (if any) in the description and the claims do not imply any particular order or time sequence, but are included to distinguish similar elements. Those terms used as such can be exchanged in some appropriate situations to enable the implementation of the described embodiments in a different order from that shown herein. Further, the terms "comprise", "include", "have" and any other variants mean to encompass "including and not exclusive", so that procedures, methods, items or devices that comprise, include or have a series of elements should not be limited to those elements, but may comprise other elements that are not explicitly listed or are inherent to those procedures, methods, items or devices.

As mentioned above, the object of the present invention is to reduce the amplitude of the ramp compensation voltage while providing adequate compensation slope, and to provide adaptive ramp compensation over a broad range of duty cycle and frequency.

Returning to FIG. 8, it has been found by the inventors that if the charging current meets the following condition:

$$I_{charge}(t) = K' \times \frac{f_s}{(1-D) \cdot DT_S} \quad (10)$$

charging the circuit shown in FIG. 8 with the charging current, a quadratic compensation voltage can be obtained in the following form:

$$V_{Slope}(t) = \frac{1}{2} \times \frac{gm3}{C_{C1}C_{C2}} \times K' \times \frac{f_s}{(1-D) \cdot DT_S} \cdot t^2 \quad (11)$$

let $K = \frac{1}{2} \times \frac{gm3}{C_{C1}C_{C2}} \times K'$, then $$V_{Slope}(t) = K \times \frac{f_s}{(1-D) \cdot DT_S} \cdot t^2 \quad (12)$$

For an operating point tc=DTs, the following slope can be obtained:

$$\left.\frac{d}{dt} V_{slope}(t)\right|_{t=DT_S} = K \times \frac{f_s}{1-D} \quad (13)$$

Obviously, this slope meets the target slope. In addition, by charging the circuit shown in FIG. 8 with the above charging current, the amplitude of the ramp compensation voltage can be decreased.

Based on the above concept, a system can be designed correspondingly.

Figure 11:
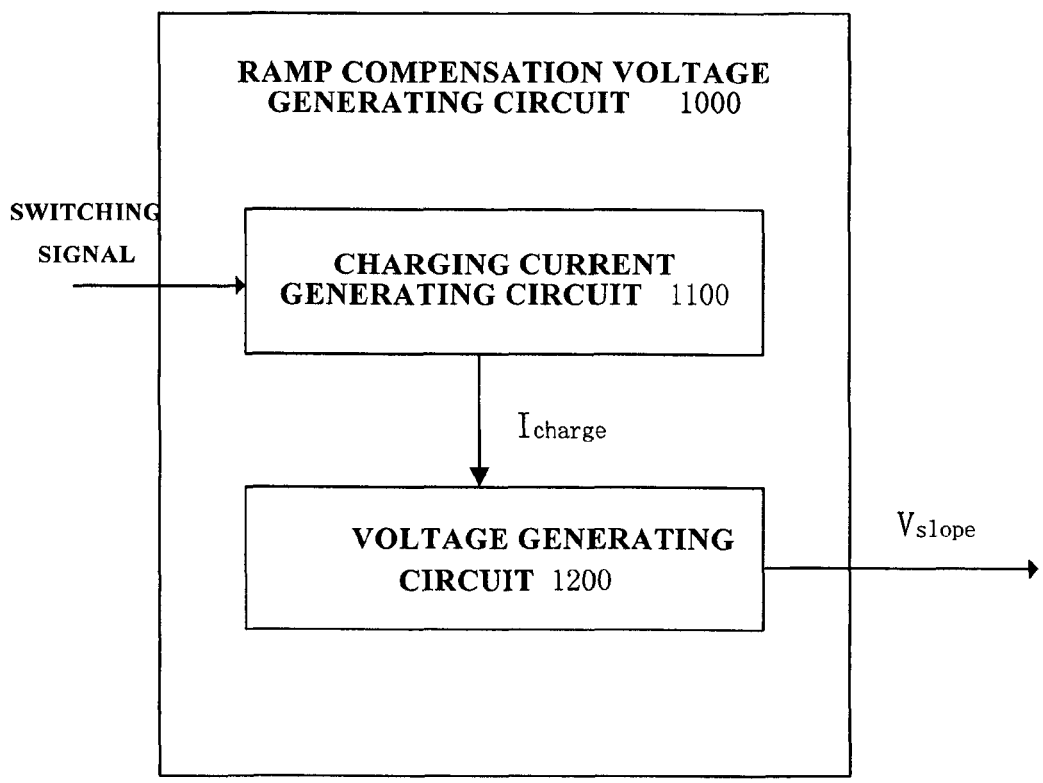
FIG. 11 is a block diagram of a ramp compensation voltage generating circuit according to the present invention.

FIG. 11 shows a block view of a ramp compensation voltage generating circuit 1000 according to embodiments of this invention. As shown in this figure, ramp compensation voltage generating circuit 1000 comprises a charging current generating circuit 1100 and a voltage generating circuit 1200. Charging current generating circuit 1100 receives a switching signal, which has a frequency of fs, a duty cycle of D and a period of Ts; the charging current generating circuit 1100 generates a charging current $I_{charge}$ in direct proportion to $$\frac{f_s}{(1-D)DTs}.$$

The charging current generating circuit 1100 provides the charging current $I_{charge}$ to the voltage generating circuit 1200. The voltage generating circuit 1200 generates and outputs a quadratic ramp compensation voltage $V_{slope}$ by using the charging current $I_{charge}$.

Figure 12:
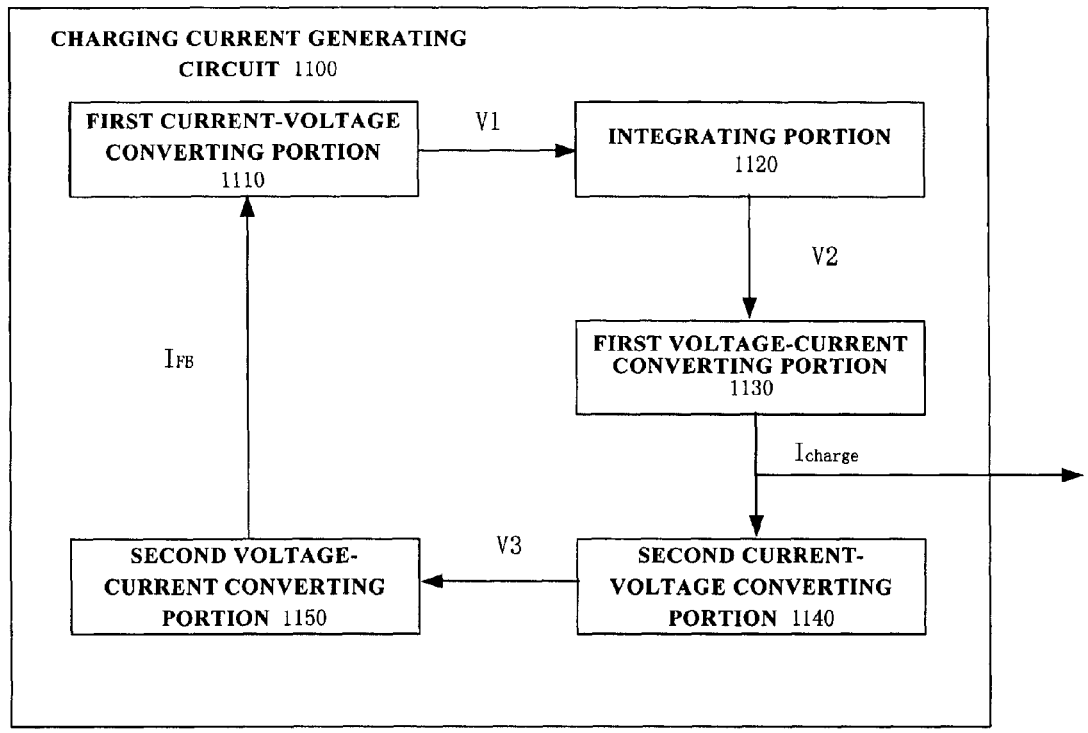
FIG. 12 is a block diagram of a charging current generating circuit according to the present invention.

FIG. 12 shows a block view of the charging current generating circuit 1100 according to one possible embodiment of the invention. As illustrated in the figure, the charging current generating circuit 1100 comprises: a first current-voltage converting portion 1110, an integrating portion 1120, a first voltage-current converting portion 1130, a second current-voltage converting portion 1140, and a second voltage-current converting portion 1150. The first current-voltage converting portion 1110 has an equivalent impedance in direct proportion to $$\frac{(1-D)}{fs}$$

and generates a first voltage V1. The integrating portion 1120 is coupled to the first current-voltage converting portion 1110 for integrating the first voltage V1 and thereby providing a second voltage V2. The first voltage-current converting portion 1130 is coupled to the integrating portion 1120 for converting the second voltage V2 to the charging current $I_{charge}$. The second current-voltage converting portion 1140 is coupled to the first voltage-current converting portion 1130 and has an equivalent impedance in direct proportion to $$\frac{D}{fs}$$

for receiving the charging current $I_{charge}$ and converting it to a third voltage V3. The second voltage-current converting portion 1150 is coupled to the second current-voltage converting portion 1140 and the first current-voltage converting portion 1110 for converting the third voltage V3 to a first current $I_{FB}$ to provide to the first current-voltage converting portion 1110.

Figure 13:
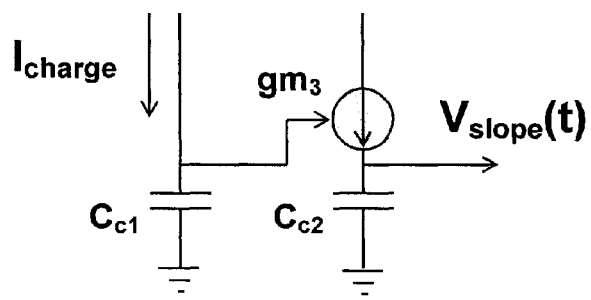
FIG. 13 shows a schematic diagram of a voltage generating circuit according to the present invention.

FIG. 13 is a schematic diagram showing the voltage generating circuit 1200 according to embodiments of this invention. As shown in FIG. 13, a capacitor $C_{c1}$ and a capacitor $C_{c2}$ each have one end grounded and another end connected to a transconductive component, which is used to convert voltage to current. Through charging the capacitor $C_{C1}$ with $I_{charge}$, a corresponding voltage is generated on one end of capacitor $C_{C1}$. The transconductive component receives the voltage and converts it to current to charge the capacitor $C_{c2}$ and generate a ramp compensation voltage $V_{slope}(t)$ on one end of the capacitor $C_{c2}$. Through charging the structure of two capacitors and a transconductive component with the charging current $I_{charge}$, the quadratic ramp compensation voltage $V_{slope}(t)$ can be obtained.

Figure 14:
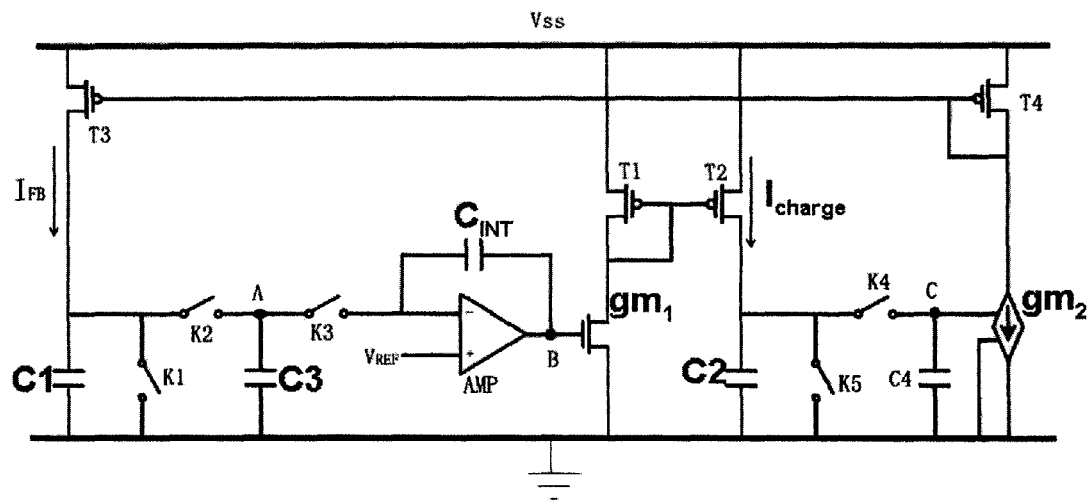
FIG. 14 shows a circuit diagram of one implementation of the charging current generating circuit according to the present invention.

FIG. 14 shows one possible implementation of the charging current generating circuit. As shown in FIG. 14, K1, K2, K3, K4 and K5 are switches; the switches K1 and K3 have the same turn on/off state, while the switches K2, K5 have the opposite turn on/off state with respect to the switches K1, K3 and K4. The switching signal has a frequency of fs, a period of Ts and a duty cycle of D. In one embodiment, T1, T2, T3 and T4 are PMOS transistors. The gates of the transistors T1 and T2 are connected together, the sources of T1 and T2 are connected to a power line Vss, and the drain of T1 is connected to the gate of T1. The transistors T1 and T2 form a current mirror in the circuit. The gates of the transistors T3 and T4 are connected together, the sources of T3 and T4 are connected to the power line Vss, and the drain of T4 is connected to the gate of T4. The transistors T3 and T4 form another current mirror in the circuit. In another embodiment, the transistors T1, T2, T3 and T4 also can be NMOS transistors. Assuming the current flowing through the transistor T3 is $I_{FB}$, the current flowing through the transistor T2 is $I_{charge}$. The capacitors C1, C3 are connected in parallel, and the capacitors C2, C4 are connected in parallel.

AMP is an operational amplifier. The non-inverting terminal of the operational amplifier AMP is connected to a reference voltage $V_{REF}$, and a capacitor $C_{INT}$ is connected between the inverting terminal and the output terminal of the operational amplifier AMP. A transconductive component having a transconductance of gm1 converts the output voltage of the amplifier to a current. In this embodiment, gm1 can be a NMOS transistor. Another transconductive component has a transconductance gm2.

In the circuit shown in FIG. 14, the capacitors C1, C3 and the switches K1 and K2 form a first current-voltage converting portion for converting the current $I_{FB}$ to a voltage, and outputting the voltage V1 at a node A. The first current voltage converting portion has an equivalent impedance of $$\frac{(1-D)}{C_1 f_s}.$$

The switch K3, the capacitor $C_{INT}$ and the operational amplifier AMP form an integrating portion, which outputs an integral voltage V2 at a node B. The transconductive component gm1 and the transistors T1 and T2 form a first voltage-current converting portion to convert the voltage V2 outputted at the node B to the charging current $I_{charge}$. The capacitors C2 and C4 and the switches K4 and K5 form a second current-voltage converting portion to convert the current $I_{charge}$ to a voltage and output a voltage V3 at a node C. The second current voltage converting portion has an equivalent impedance of $$\frac{D}{C_2 f_s}.$$

The transconductive component gm2 and the transistors T3 and T4 form a first voltage-current converting portion to convert the voltage V3 outputted at the node C to a first current $I_{FB}$. The first current $I_{FB}$ is in turn provided to the first current-voltage converting portion so that the whole circuit forms a feedback loop.

It can be obtained from the circuit of FIG. 14:

$$I_{FB} = \frac{V_{REF} \times C_1}{(1-D)T_S} \tag{14}$$

where, $$I_{FB} = I_{charge} \times \frac{DT_S}{C_2} \times gm_2 \tag{15}$$

and thus, $$I_{charge} = \frac{V_{REF} \times C_1 C_2 \times f_S}{gm_2 \times (1-D) \cdot DT_S} \tag{16}$$

That is, the desired $I_{charge}$ can be obtained through the circuit shown in FIG. 14.

Below, a stability analysis is carried out on the whole circuit. It can be obtained from the circuit shown in FIG. 14:

$$Gain_{LOOP} = gm_1 \times \frac{DTs}{C_2} \times gm_2 \times \frac{(1-D)Ts}{C_1} \times \frac{C_3}{j\omega \cdot C_{INT} \cdot T_S} \tag{17}$$

wherein, $Gain_{LOOP}$ is the gain of the whole loop, ω is angular frequency, and fc is the frequency when the gain is reduced to 1, $f_c \ll f_s$.

The frequency at which $Gain_{LOOP}=1$ is a crossover frequency $\omega_c$:

$$Gain_{LOOP} = 1 = gm_1 \times \frac{DTs}{C_2} \times gm_2 \times \frac{(1-D)Ts}{C_1} \times \frac{C_3}{j\omega_c \cdot C_{INT} \cdot T_S} \tag{18}$$

then $$f_c = \frac{\omega_c}{2\pi} = gm_1 \times \frac{DTs}{C_2} \times gm_2 \times \frac{(1-D)Ts}{C_1} \times \frac{C_3}{2\pi \cdot C_{INT} \cdot T_S} \tag{19}$$

that is, $$f_c = gm_1 \times gm_2 \times \frac{C_3}{2\pi \cdot C_2 C_{INT} C_1} \times (1-D)DT_S \tag{20}$$

If gm1 is realized by an NMOS transistor, according to the principles of the NMOS transistor, the relationship of gm1, the parameter β of the NMOS transistor and the current $I_{charge}$ flowing therethrough is as follows:

$$gm_1 = \sqrt{2\beta \cdot I_{charge}} \tag{21}$$

Substituting equation (21) into equation (20), it can be obtained:

$$f_c = \frac{C_3}{2\pi \cdot C_{INT} C_1} \sqrt{2\beta \times V_{REF} \times gm_2 \times \frac{C_1}{C_2} \times D(1-D)} \qquad (22)$$

Therefore, preferably, more stable operation of the loop can be guaranteed by a selection of $$f_c \le \frac{1}{12} \times f_S.$$

Nevertheless, the circuit also can operate under other frequencies.

Figure 8:
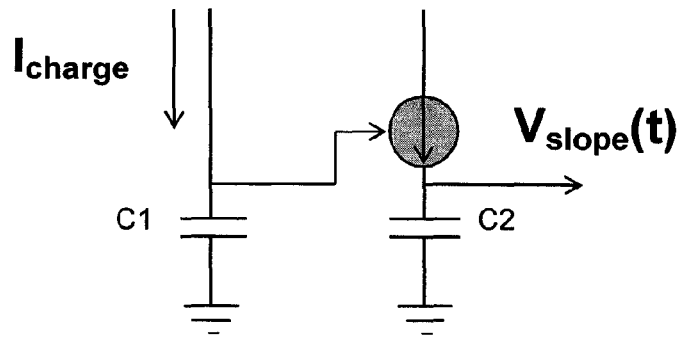
FIG. 8 is a schematic diagram showing the basic principles of a quadratic ramp compensation technique.
Figure 9:
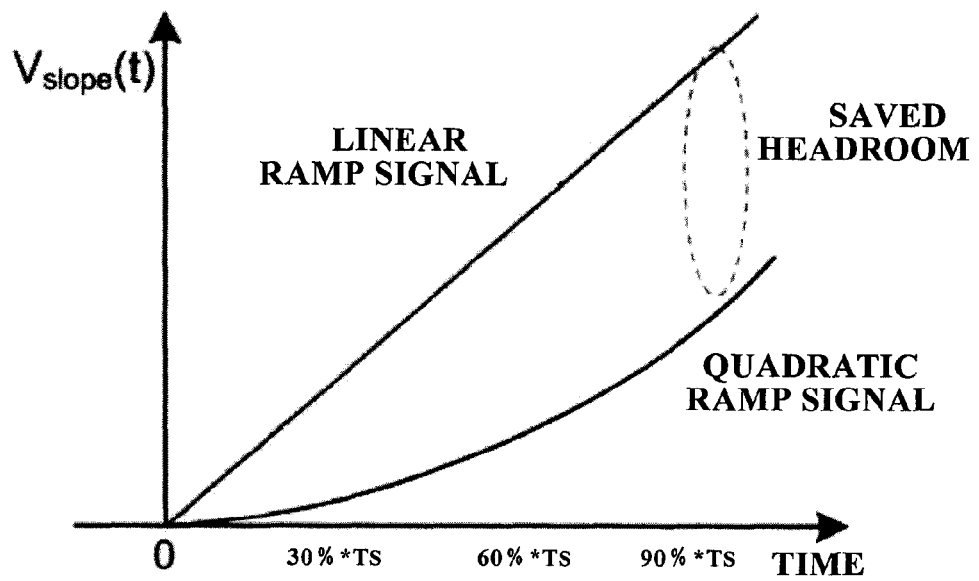
FIG. 9 is a diagram showing the relationships between the ramp compensation voltage for the quadratic ramp compensation technique as well as the ramp compensation voltage for the fixed linear ramp compensation technique, and time, given that the target slope of the ramp compensation voltage at an operating point tc=DTs is satisfied.
Figure 10:
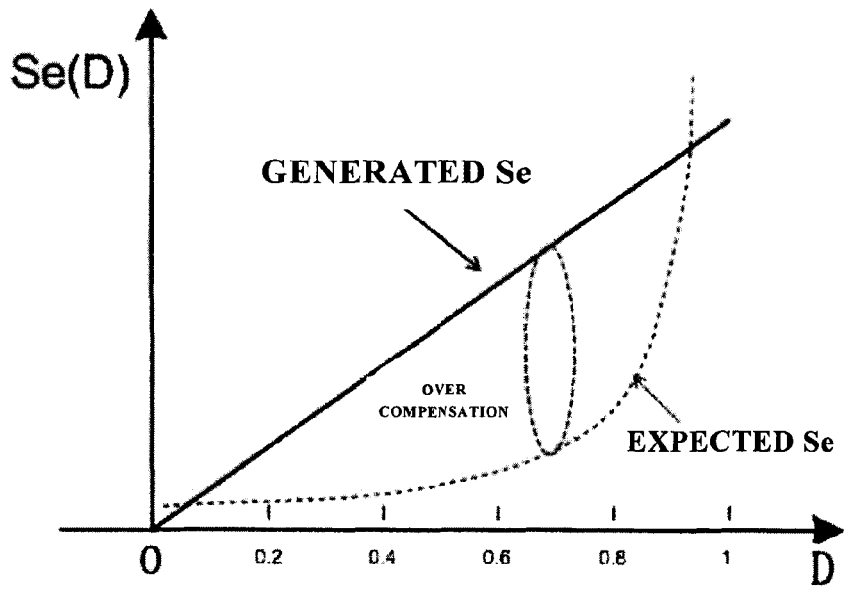
FIG. 10 is a diagram showing the relationship between the expected slope and the compensation slope generated for the quadratic ramp compensation technique.

By charging the compensation voltage generating circuit shown in FIG. 8 with the charging current $I_{charge}$ generated by the circuit shown in FIG. 14, what can be obtained is:

$$V_{Slope}(t) = \frac{1}{2} \times \frac{gm_3 C_1 C_2}{gm_2 C_{C1} C_{C2}} \times V_{REF} \times \frac{f_s^2}{D(1-D)} \cdot t^2 \qquad (23)$$

$$\text{Let } K = \frac{1}{2} \times \frac{gm_3 C_1 C_2}{gm_2 C_{C1} C_{C2}} \times V_{REF} \qquad (24)$$

then, $$Se(D) = Se(t)\bigg|_{t=DT_s} = \frac{d}{dt} V_{Slope}(t)\bigg|_{t=DT_s} = 2 \times K \times \frac{f_s}{(1-D)} \qquad (25)$$

It can be seen from equation (25) that the generated slope varies with the frequency fs and duty cycle D.

$$Se_{target} = K_L \times \frac{f_s}{1-D}.$$

As described above, the expected target slope is $$\text{Let } Se(D) = Se_{target}, \text{ then } K = \frac{1}{2} \times K_L.$$

The peak value of the ramp compensation voltage in the fixed linear ramp compensation technique is:

$$V_{slope\_linear\_max} = Se_{target} \times D_{max} T_S = K_L \times \frac{D_{max}}{1-D_{max}}$$

However, the peak value of the ramp compensation voltage generated in the present invention is:

$$V_{slope\_quratic\_max} = V_{Slope}(D_{max} T_S) = K \times \frac{D_{max}}{1-D_{max}} \qquad (26)$$

It can be seen that the peak value of the ramp compensation voltage is reduced by 50% in the present invention as compared to the fixed linear ramp compensation technique.

Figure 15:
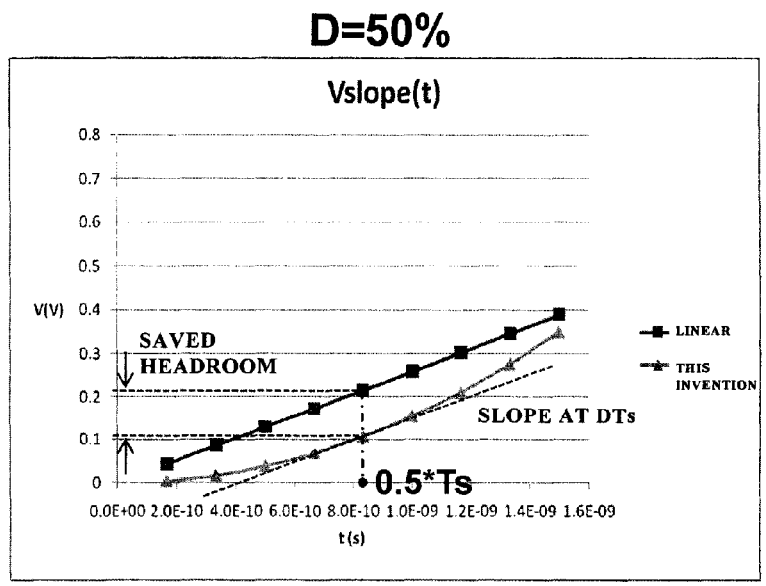
FIG. 15 ($a$) and FIG. 15 ($b$) are diagrams showing the simulation results of the ramp compensation voltages for the fixed linear ramp compensation technique and the present invention at 50% and 90% duty cycles, respectively.
Figure 15:
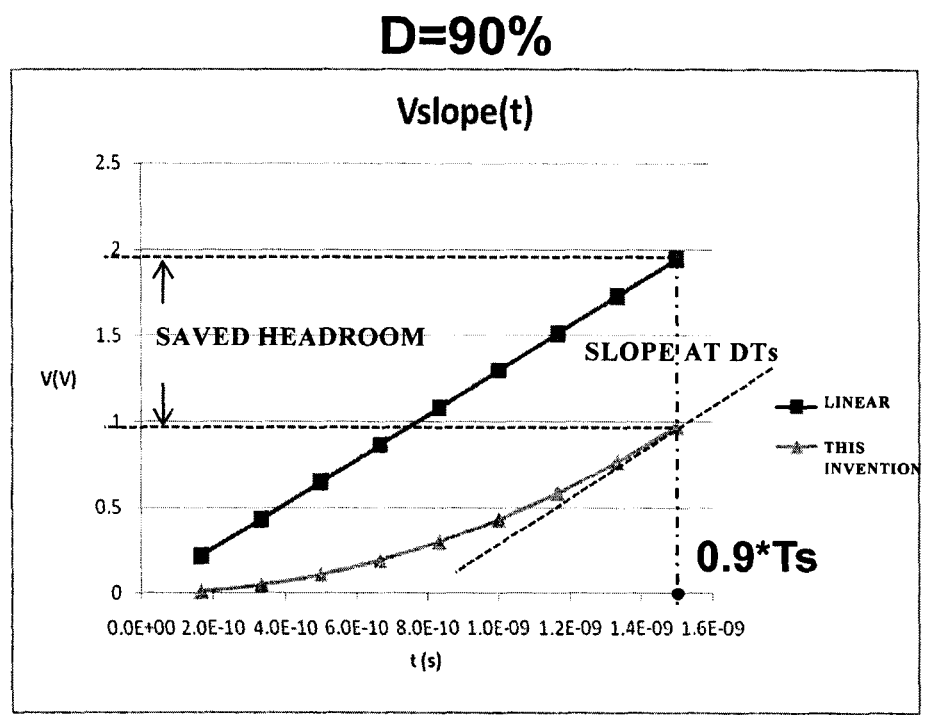

FIG. 15(a) and FIG. 15(b) are diagrams showing the simulation results of the ramp compensation voltages for the fixed linear ramp compensation technique and for the present invention at 50% and 90% duty cycles, respectively, wherein fs=600 KHz and Ts=1.67 μs. In the case of a duty cycle of 50%, the peak value of the ramp compensation voltage in the fixed linear ramp compensation technique is 0.22V, while the peak value of the ramp compensation voltage in the present invention is 0.11V. In the case of a duty cycle of 90%, the peak value of the ramp compensation voltage in the fixed linear ramp compensation technique is 1.9V, while the peak value of the ramp compensation voltage in the present invention is 0.9V. It can be seen that with the present invention, the peak value of the compensation voltage can be effectively decreased, particularly for large duty cycles.

The ramp compensation voltage generating circuit of the present invention can be used in a corresponding switching regulator. The components of the switching regulator and their connections with the ramp compensation voltage generating circuit of the present invention are well known by those skilled in the art, and will be omitted herein. A switching regulator containing the ramp compensation voltage generating circuit of the present invention can be used in various power supplies as well. The components in the power supply and their connection with the switching regulator are well known by those skilled in the art, and will be omitted herein.

Figure 16:
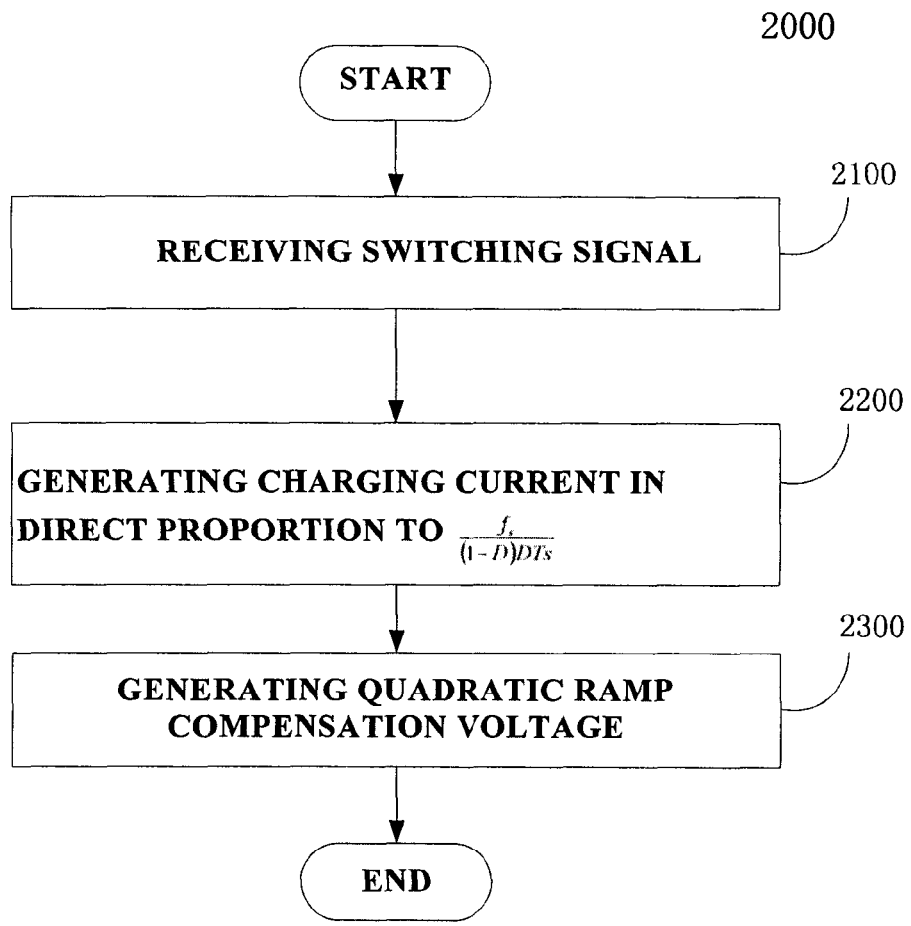
FIG. 16 shows a flowchart of a method for generating a ramp compensation voltage according to the present invention.

FIG. 16 is a flowchart of a method of generating a ramp compensation voltage according to embodiments of this invention. As shown in FIG. 16, the method 2000 of generating a ramp compensation voltage is performed as follows. A switching signal is received at step 2100, wherein the switching signal has a frequency of fs, a duty cycle of D and a period of Ts. At step 2200, a charging current $I_{charge}$ in direct proportion to $$\frac{f_s}{(1-D)DT_s}$$

is generated. At step 2300, a quadratic ramp compensation voltage $V_{slope}$ is generated by using the charging current.

Figure 17:
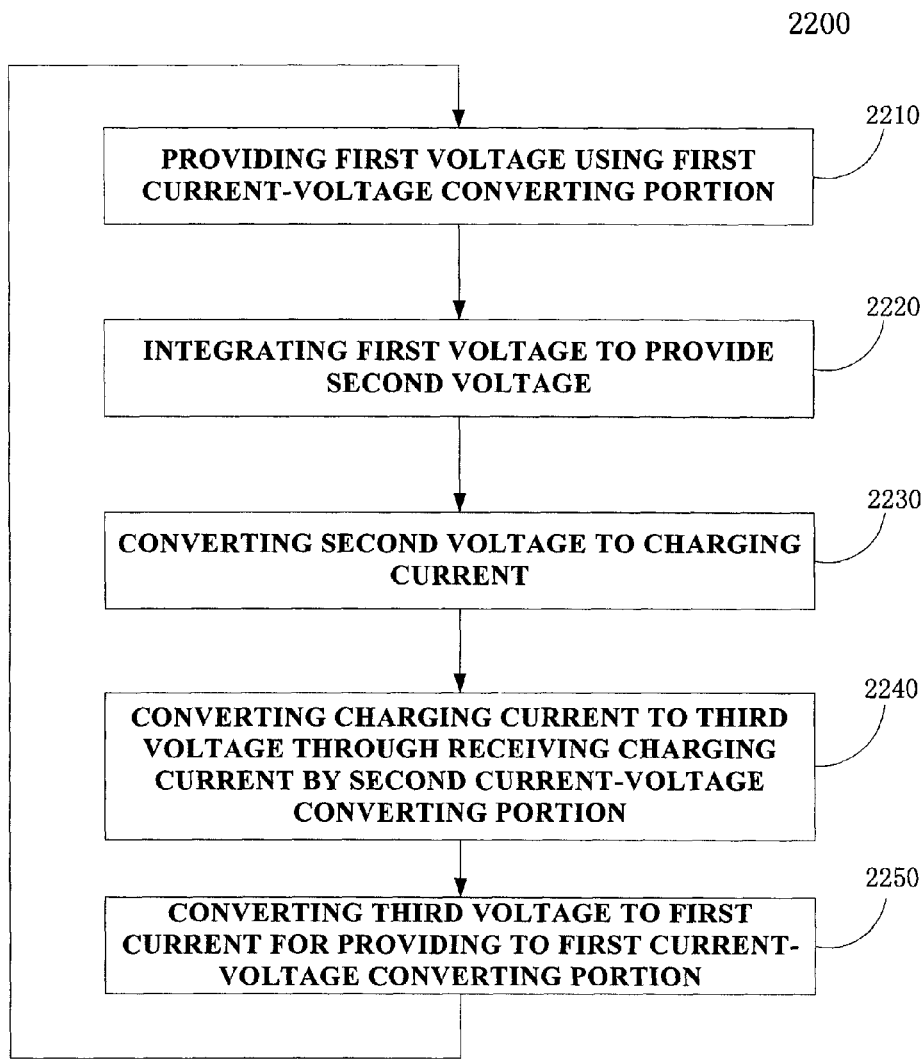
FIG. 17 shows a further detailed flowchart for the step of generating charging current according to the present invention.

FIG. 17 shows a further detailed flowchart of the step 2200 of generating a charging current $I_{charge}$ according to the present invention. The step 2200 of generating a charging current $I_{charge}$ is performed as follows. At step 2210, a first voltage V1 is provided using the first current-voltage converting portion 1100, wherein the first current-voltage converting portion 1100 has an equivalent impedance in direct proportion to $$\frac{(1-D)}{f_S}.$$

At step 2220, the voltage V1 is integrated to provide a second voltage V2. At step 2230, the second voltage V2 is converted to the charging current $I_{charge}$. At step 2240, through receiving the charging current $I_{charge}$ by the second current-voltage converting portion 1150, the charging current $I_{charge}$ is converted to a third voltage V3, wherein the second current-voltage converting portion 1150 has an equivalent impedance in direct proportion to $$\frac{D}{fs}$$

At step 2250, the third voltage V3 is converted to a first current $I_{FB}$, which is provided to the first current-voltage converting portion 1100. Then, the steps 2210-2250 are repeated to form feedback.

In addition, generating a quadratic ramp compensation voltage with the charging current $I_{charge}$ comprises: providing the first capacitor $C_{C1}$ and the second capacitor $C_{C2}$ connected through the voltage-current converting component; charging the first capacitor $C_{C1}$ with the charging current $I_{charge}$ and charging the second capacitor $C_{C2}$ with the voltage generated by the first capacitor $C_{C1}$ via the voltage-current converting component so as to generate the quadratic ramp compensation voltage $V_{slope}$.

With this invention, an appropriate ramp compensation signal can be generated, enabling the switching regulator to operate over a broad range of duty cycles. The generated slope is adaptive to an inductor if the inductor is selected following the design specification. According to the present invention, the generated ramp compensation voltage is only 50% of the ramp compensation voltage generated in the existing fixed linear ramp compensation technique, significantly saving error amplifier headroom. The present invention is applicable to low input voltage and large current designs for switching regulators operating in the peak current mode, and is capable of realizing large duty cycles (larger than 90%). The present invention can also realize high performance current loop compensation.

Those skilled in the art will appreciate from the above description that the present invention can be implemented in various manners, and various embodiments can be implemented alone or in any combination. Therefore, although the embodiments of this invention have been described with specific examples, the actual scope of the embodiments and/or methods of the embodiments of this invention is not limited thereto. Other modifications will become apparent to those skilled in the art through studying the figures, specification and claims appended hereinafter.

What is claimed is:

1. A circuit for generating a ramp compensation voltage, comprising:
    a charging current generating circuit, configured to receive information indicative of a switching signal including information indicative of a frequency of fs, a duty cycle of D and a period of Ts, the charging current generating circuit generating a charging current in direct proportion to $$\frac{fs}{(1-D)DTs},$$

the charging current generating circuit including:
    a first current-voltage converting portion configured to provide an impedance proportional to $$\frac{(1-D)}{fs}$$

to establish a first voltage;
    an integrating portion coupled to the first current-voltage converting portion configured to receive a receive the first voltage and configured to establish a second voltage including an integrated representation of the first voltage;
    a first voltage-current converting portion configured to receive the second voltage and configured to establish the charging current;
    wherein the first current-voltage converting portion is configured to receive an input current established using the charging current; and
    a voltage generating circuit for generating a quadratic ramp compensation voltage using the charging current.

2. The circuit of claim 1, wherein the charging current generating circuit comprises:
    a second current-voltage converting portion coupled to the first voltage-current converting portion to receive the charging current, the second current-voltage converting portion configured to provide an impedance proportional to $$\frac{D}{fs}$$

to establish a third voltage; and
    a second voltage-current converting portion coupled to the second current-voltage converting portion to receive the third voltage and configured to establish the input current using the received third voltage.

3. The circuit of claim 2, wherein the second voltage-current converting portion is a component having transconductive properties and is configured to convert voltage to current.

4. The circuit of claim 2, wherein the second current-voltage converting portion comprises a second switched capacitor network configured to provide an equivalent impedance proportional to $$\frac{D}{fs}$$

to establish the third voltage.

5. The circuit of claim 1, wherein the voltage generating circuit comprises a first capacitor and a second capacitor, and a transconductive component coupled between the first and second capacitors, wherein the first capacitor receives the charging current and generates a corresponding voltage to be received by the transconductive component, the transconductive component converts the voltage to a current for charging the second capacitor, and the second capacitor generates the quadratic ramp compensation voltage.

6. The circuit of claim 1, wherein the input current is in inverse proportion to (1−D)Ts.

7. The circuit of claim 1, wherein the integrating portion is a switched capacitor integrator.

8. The circuit of claim 1, wherein the first voltage-current converting portion is a component having transconductive properties and is configured to convert voltage to current.

9. The circuit of claim 1, wherein the first voltage-current converting portion is a NMOS transistor or a PMOS transistor.

10. The circuit of claim 1, wherein a bandwidth of said circuit for generating the ramp compensation voltage is less than or equal to fs/12.

11. The circuit of claim 1, wherein said circuit for generating the ramp compensation voltage forms a portion of a switching regulator.

12. The circuit of claim 1, wherein the first current-voltage converting portion comprises a first switched capacitor network configured to provide an equivalent impedance proportional to $$\frac{(1-D)}{fs}$$

to establish the first voltage.

13. A method for generating a ramp compensation voltage, comprising:
receiving information indicative of a switching signal including information indicative of a frequency of fs, a duty cycle of D and a period of Ts;
generating a charging current in direct proportion to $$\frac{f_s}{(1-D)DTs}$$

including:
providing an impedance proportional to $$\frac{(1-D)}{fs}$$

to establish a first voltage in response to an input current using a first current-voltage converting circuit;
integrating the first voltage to establish a second voltage including an integrated representation of the first voltage;
establishing the charging current using the second voltage; and
establishing the input current at least in part using the charging current to establish a feedback loop; and
generating a quadratic ramp compensation voltage using the charging current.

14. The method of claim 13, wherein generating the charging current in direct proportion to fs/(1−D)DTs comprises: receiving the charging current using a second current-voltage converting circuit having an impedance proportional to D/fs to establish a third voltage; receiving the third voltage and using the third voltage to establish the input current to provide to the first current-voltage converting circuit.

15. The method of claim 14, wherein the second current-voltage converting circuit comprises a second switched capacitor network configured to provide an equivalent impedance proportional to (1−D)/fs to establish the third voltage.

16. The method of claim 13, wherein generating the quadratic ramp compensation voltage using the charging current comprises:
providing a first capacitor and a second capacitor, which are connected together via a voltage-current converting component;
charging the first capacitor with the charging current; and
charging the second capacitor with a voltage generated by the first capacitor via the voltage-current converting component to generate the quadratic ramp compensation voltage.

17. The method of claim 14, wherein the input current is in inverse proportion to (1−D)Ts.

18. The method of claim 13, wherein the ramp compensation voltage is used to control a switching regulator.

19. The method of claim 13, wherein a bandwidth of a circuit for generating the ramp compensation voltage is less than or equal fs/12.

20. The method of claim 13, wherein the first current-voltage converting circuit comprises a first switched capacitor network configured to provide an equivalent impedance proportional to (1−D)/fs to establish the first voltage.

* * * * *